United States Patent [19]

Minami et al.

[11] Patent Number: 4,790,973

[45] Date of Patent: Dec. 13, 1988

[54] METHOD OF MAKING INJECTION-MOLDED SLIDE FASTENER SLIDERS

[75] Inventors: Hiroo Minami, Uozu; Kazuo Ida, Toyama, both of Japan

[73] Assignee: Yoshida Kogyo K. K., Tokyo, Japan

[21] Appl. No.: 165,026

[22] Filed: Mar. 7, 1988

[30] Foreign Application Priority Data

Mar. 17, 1987 [JP] Japan .................................. 62-62106
Jan. 23, 1988 [JP] Japan .................................. 63-13324

[51] Int. Cl.$^4$ ........................... B28B 7/16; B29D 5/00
[52] U.S. Cl. .................................... 264/242; 264/250;
425/DIG. 34; 249/142
[58] Field of Search ............................ 264/242, 250;
425/DIG. 34; 249/142

[56] References Cited

U.S. PATENT DOCUMENTS 2,509,278 5/1950 Scheuermann et al. ............ 249/142
2,705,345 4/1955 Epple .................................. 249/142
2,736,062 2/1956 Scheuermann et al. ............ 249/142

*Primary Examiner*—Jan H. Silbaugh
*Assistant Examiner*—Yun H. Wang

*Attorney, Agent, or Firm*—Hill, Van Santen, Steadman & Simpson

[57] ABSTRACT

A method of making an injection-molded slide fastener slider includes a first injection-molding step for forming a slider body having an integral arch-shaped support lug and a second injection-molding step for forming a pull tab threaded through a transverse hole in the support lug. For pivotal connection of the pull tab with the support lug, a mold used for achieving the method includes a combination of a main slide core and an auxiliary slide core slidably associated therewith. In the first injection-molding step, the auxiliary slide core is held in a first position in which the two slide cores jointly have a shape corresponding to the shape of the transverse hole while blocking fluid communication between first and second mold cavities in which the slider body and a body of the pull tab are formed respectively. Then the auxiliary slide core is moved to a second position in which a third mold cavity corresponding in shape to a pintle of the pull tab and communicating with the second mold cavity is defined between the slide cores and the underside of the already molded lug. Thereafter, the second injection-molding step is carried out.

10 Claims, 7 Drawing Sheets

METHOD OF MAKING INJECTION-MOLDED SLIDE FASTENER SLIDERS

BACKGROUND OF THE INVENTION

1. Field of the Invention

This invention relates generally to the manufacture of sliders for slide fasteners, and more particularly to a method of making an injection-molded slide fastener slider in which a slider body and a pull tab are molded on a single mold in a coupled or assembled state.

2. Prior Art

In the manufacture of slide fastener sliders, it has been customary practice to first form a slider body, an arch-shaped support lug and a pull tab independently of each other by injection-molding, and then assemble these three component parts into a slide fastener by ultrasonically welding the support lug to an upper wing of the slider body with the pull tab pivotally connected with the support lug. The conventional practice has a drawback however that the ultrasonic welding provides various degrees of bonding and involves an incidental welding failure which cannot be detected by visual inspection, lowering the rate of production.

With the foregoing drawback in view, a somewhat successful method has been proposed by U.S. Pat. No. 2,509,278 in which a slider body and a pull tab are molded simultaneously in only one molding step in a coupled or assembled state. The proposed method employs a mold composed of two mold members or halves constructed to form the front and rear portions of a slider body, respectively. For connection with the slider body, the pull tab is molded in a tilted position in which the pull tab extends obliquely to an upper wing of the slider body at an angle of 45 degrees. The mold further includes two opposed slide cores movable sidewise into the mold halves so as to form simultaneously an aperture in the pull tab in which a support lug is to be threaded, a transverse hole in the support lug, a spindle or pintle received in the transverse hole, and a gap between the pintle and the upper wing.

The method disclosed in the above-identified U.S. patent is advantageous in that the slider body and the pull tab can be molded simultaneously in a single molding step in a coupled state. This method however is still unsatisfactory in that the slide cores are complicated in shape and configuration and hence need to be finished on a high precision machine. The mold having such complicated slide cores can produce only a small number of molded sliders per mold, resulting in expensive products. The use of such complicated mold involves a large amount of objectionable burrs formed on a molded slider and hence is not suitable for mass-production.

SUMMARY OF THE INVENTION

With the foregoing difficulties in view, it is an object of the present invention to provide a method of making an injection-molded slide fastener slider on a mold which is simple in construction and capable of producing a relatively large number of molded sliders per mold.

Another object of the present invention is to provide a method of making an injection-molded slider in which a slider body and a pull tab are formed of different materials.

A further object of the present invention is to provide a method of making an injection-molded slider in which a slider body and a pull tab have different colors.

According to the present invention, there is provided a mothod of making an injection-molded slide fastener slider, the slider including a slider body having upper and lower wings joined at their front ends by a neck so as to define therebetween a Y-shaped guide channel, an arch-shaped support lug integral with a top surface of the upper wing and extending longitudinally of the slider body so as to define jointly with the top surface a transverse hole, and a pull tab pivotally connected with the arch-shaped support lug and having a pintle loosely received in the transverse hole, said method including a first injection-molding step for integrally forming the slider body and the support lug and a second injection-molding step for integrally forming a body of the pull tab and the pintle.

For achieving the first and second injection-molding steps, there is provided a mold including a pair of complementary mold members jointly defining therebetween a first mold cavity for forming the slider body including the support lug and a second mold cavity for forming the pull tab except the pintle, the first and second mold cavities communicating with each other. The mold further includes a main slide core slidably disposed in the first cavity and having an auxiliary slide core slidably associated therewith, the main and auxiliary slide cores jointly having a shape complementary to the shape of the transverse hole. The auxiliary slide core is movable between a first position to block communication between the first and second mold cavities and a second position to allow communication between the first and second mold cavities.

After the mold is closed while the auxiliary slide core is kept in said first position, the first injection-molding step is carried out by injecting an amount of molten material into the closed mold to fill the first cavity, thereby forming the slider body and the support lug.

Subsequently, while keeping the mold in the closed condition, the auxiliary slide core is moved from said first position to said second position to form a third cavity complementary in contour to the shape of the pintle, partly defined by the underside of the just molded support lug and communicating with the second mold cavity. Then the second injection-molding step is carried out by injecting an amount of molten material into the closed mold to fill the second and third mold cavities, thereby forming the pull tab with its pintle pivotally connected with the lug on the molded slider body.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

Figure 3:
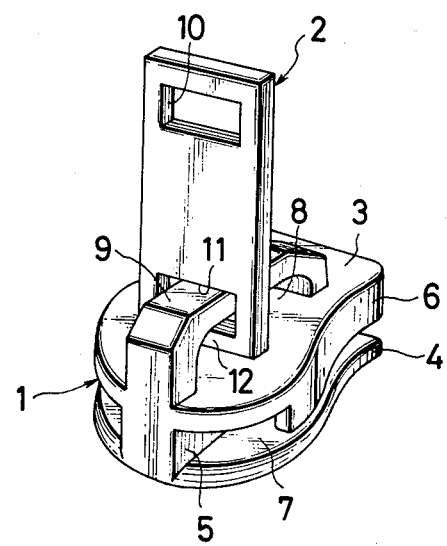
FIG. 3 is a diagrammatical perspective view of a slide fastener slider molded on the mold according to the present invention.
Figure 4:
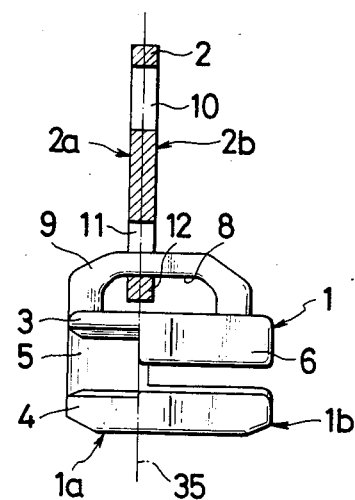
FIG. 4 is a side view, partly in cross section, of the slider.

Referring now to the drawings wherein like reference characters designate like or correspondig parts throughout several views, there is illustrated in FIGS. 3 and 4, a slide fastener slider formed by injection-molding according to the present invention. The slider is composed of a slider body 1 formed of a synthetic resin and a pull tab 2 formed of a metal and pivotally mounted thereon. The combination of materials used for the formation of the slider body 1 and the pull tab 2 is not limited to the illustrated example. It is also possible to form the slider body 1 and the pull tab 2 by the same material. Similar variations are also possible with respect to colors of the slider body 1 and the pull tab 2.

The slider body 1 includes upper and lower wings 3, 4 joined at their front ends by a diamond or neck 5 so as to define therebetween a generally Y-shaped guide channel 7 for the passage of a slide fastener chain (not shown). The upper wing 3 includes a pair of slide flanges 6 extending along opposite longitudinal edges thereof and projecting toward the lower wing 4 to define part of the guide channel 7. The slider body 1 further includes an arch-shaped support lug 9 integrally formed on a top surface of the upper wing 3 and extending longitudinally of the slider body 1, there being defined between the support lug 9 and the top surface a transverse opening or hole 8 for receiving a portion of the pull tab 2.

The pull tab 2 is in the shape of a rectangular plate and has a rectangular aperture 10 adjacent to an upper end thereof and a rectangular window 11 adjacent to the lower end, the window 11 being partly defined by a spindle or pintle 12 loosely received in the transverse hole 8.

Figure 5:
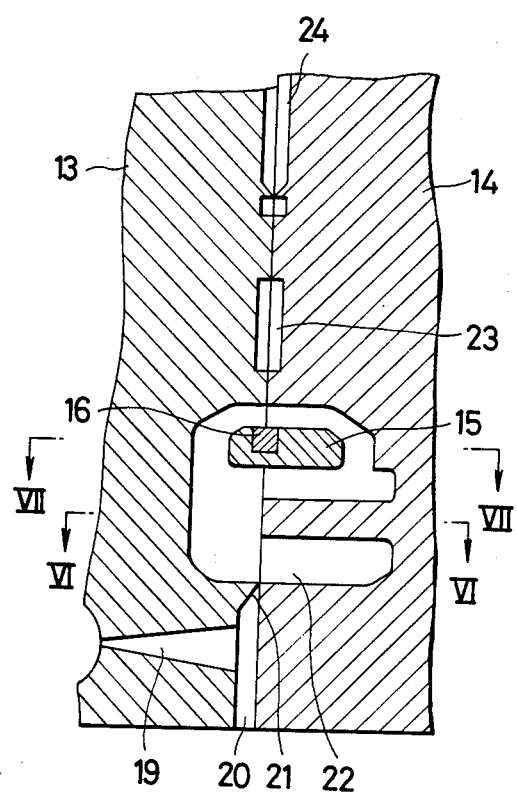
FIG. 5 is a fragmentary vertical cross-sectional view of the mold taken in a plane perpendicular to the sectional plane of FIG. 2.
Figure 6:
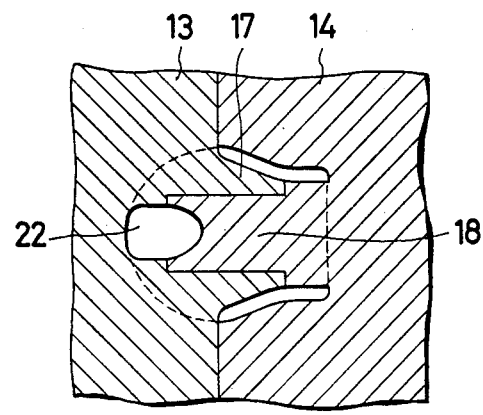
FIG. 6 is a horizontal cross-sectional view taken along line VI—VI of FIG. 5.
Figure 7:
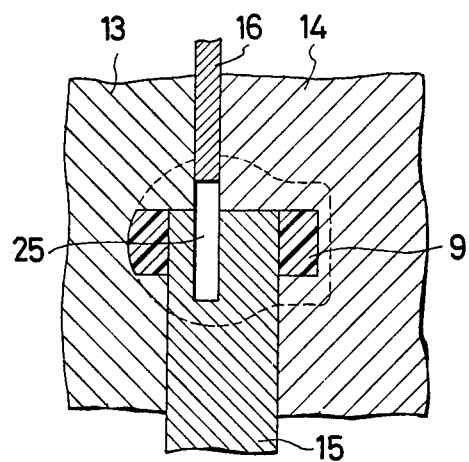
FIG. 7 is a horizontal cross-sectional view taken along line VII—VII of FIG. 5, showing a second injection-step for forming a pull tab.

The slider of the foregoing construction is molded on a mold shown in FIGS. 5–7. The mold includes a fixed mold member 13 and a movable mold member 14 adapted to be put together to close the mold. The mold further includes a main slide core 15 and an auxiliary slide core 16 slidably associated with the main slide core 15. The main and auxiliary slide cores 15, 16 are slidably disposed between the mold members 13, 14 in confronting relation to one another and movable sidewise of the mold. The mold is constructed to make the molded slider in such a manner that the pull tab 2 is disposed in a vertical position in which it extends perpendicular to the general plane of the slider body 1, as shown in FIG. 4. To this end, the fixed mold member 13 is so constructed as to form a front part 1a of the slider body 1 and a face side 2a of the pull tab 2 which are disposed on one side of a parting line 35. On the other hand, the movable mold member 14 is constructed to form the rear part 1b of the slider body 1 and the back side 2b of the pull tab that are disposed on the opposite side of the parting line 35. The fixed and movable mold members 13, 14 have respective mold cores 17, 18 (FIG. 6) adapted to be fitted together for forming the Y-shaped guide channel 7.

Figure 1:
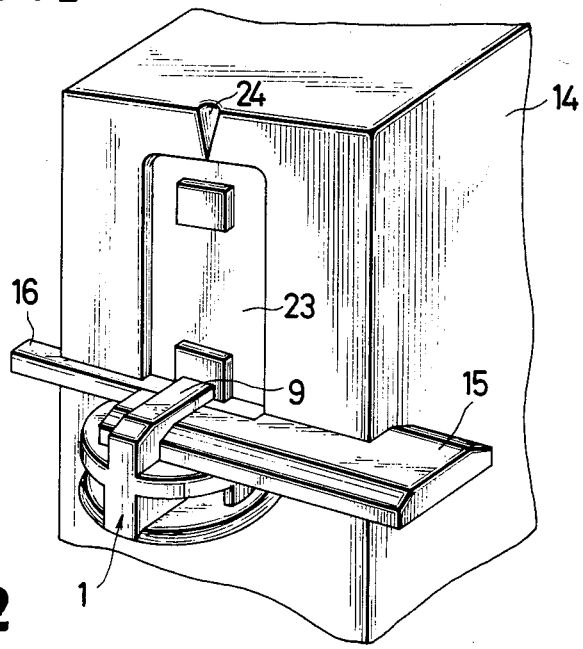
FIG. 1 is a perspective view, with parts omitted for clarity, of a mold illustrative of a first injection-molding step for forming a slider body according to the present invention.

When the mold is closed, there are defined between the two mold members 13, 14 a first mold cavity 22 for forming the slider body 1 including the support lug 9, and a second mold cavity 23 for forming the pull tab 2 except the pintle 12. The first and second mold cavities 22, 23 communicate with each other but this communication is blocked when the auxiliary slide core 16 is held in the first position shown in FIGS. 1, 2 and 5. In this instance, the main and auxiliary slide cores 15, 16 are held in intimate contact with each other within the first mold cavity 22 and jointly constitute a slide core assembly of a shape complementary in contour to the shape of the transverse hole 8. The front part of the auxiliary slide core 16 which is received in the main slide core 15 has a shape identical to the shape of the pintle 12. When the auxiliary slide core 16 is moved from the afore-mentioned first position in a direction away from the main slide core 15 until it is arrived at the second position shown in FIG. 7, at which time there is defined a third mold cavity 25 between the main and auxiliary slide core 15, 16 and the underside of the arch-shaped support lug 9 of the slider body 1 previously molded in the first cavity 22 as described later on. The third mold cavity 25 thus defined is complementary in contour to the shape of the pintle 12 and communicates with the second mold cavity 23.

As shown in FIG. 5, the fixed mold member 13 further has a first sprue 19 leading to the first cavity 22 through a first runner 20 and a first gate 21. The mold further has a second sprue 24 extending in confronting mold faces of the mold members 13, 14 and leading to the second mold cavity 23.

Figure 2:
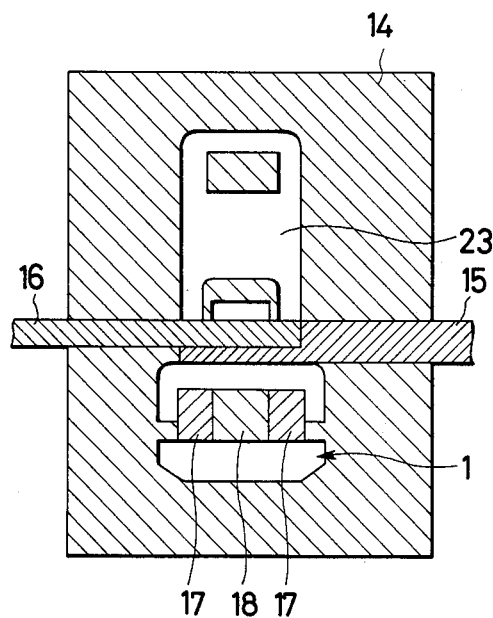
FIG. 2 is a longitudinal cross-sectional view of the mold shown in FIG. 1.

In molding, the mold is closed, that is, the two mold members 13, 14 are put together while holding the auxiliary slide core 16 in its first position shown in FIG. 2 in which the auxiliary slide core 16 is held in intimate contact with the main slide core 15. Consequently, the first mold cavity 22 is separated by the auxiliary slide core 16 from the second mold cavity 23. Then, an amount of molten synthetic resin material is injected through the first sprue 19 into the closed mold to fill the first mold cavity 22, thereby forming a slider body 1 substantially identical to the slider body 1 shown in FIG. 3.

Thereafter, while keeping the closed condition of the mold, the auxiliary slide core 16 is retracted away from the main slide core 15 by a distance equal to the width of a pull tab 2 to bemolded so that the third mold cavity 25 is defined between the main and auxiliary slide cores 15, 16 and the underside of the support lug 9 on the just molded slider body 1, as shown in FIG. 7. During that time, the molded slider body 1 is solidified to a certain extent.

Immediately thereafter or before the full solidification of the molded slider body 1 at the latest, an amount of molten metal is injected through the second sprue 24 into the closed mold to fill the second and third mold cavities 23, 25, thereby forming a pull tab 2 (identical to the pull tab shown in FIG. 3) with its pintle 12 received in the transverse hole 8 of the support lug 9. After the expiration of a cooling time set for fully solidifying the slider body 1 and the pull tab 2, the molded article (a prospective slider) is removed from the mold by parting the two mold members 13, 14 and the associated main slide core 15 as is well known in the art. The sprues, runner and gate on the molded article are removed. As a result, the slider body 1 and the pull tab 2 have been molded in coupled or assembled state.

In the second injection-molding step, the underside of the already molded support lug 9 contacts with the upper surface of a just formed pintle 12 but permanent bonding between two parts 9, 12 does not take place partly because the support lug 9 and the pintle 12 are formed of different materials and partly because the thermal contraction of the molded support lug 9 and the pintle 12 occurs when they are cooled. The latter-mentioned effect of the thermal contraction is enhanced by the second injection molding step which is effected before the full solidification of the support lug 9. With this enhanced thermal contraction effect, the pintle 12 is prevented from sticking to the already molded support lug 9 even when the slider body 1 and the pull tab 2 are molded of the same material.

Figure 8:
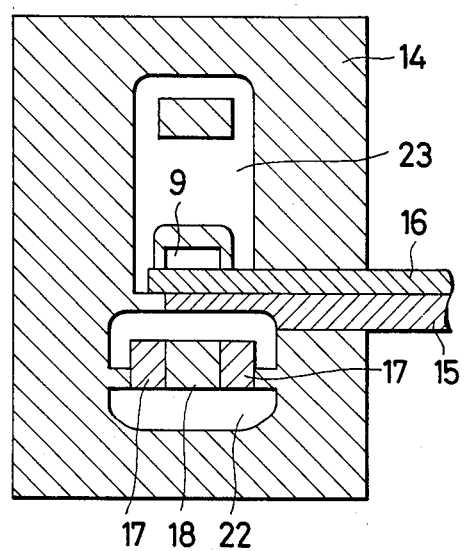
FIG. 8 is a view similar to FIG. 2, but showing a modified mold.
Figure 9:
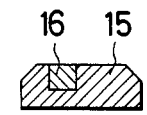
FIG. 9 is a cross-sectional view of slide cores in the mold shown in FIG. 8.
Figure 10:
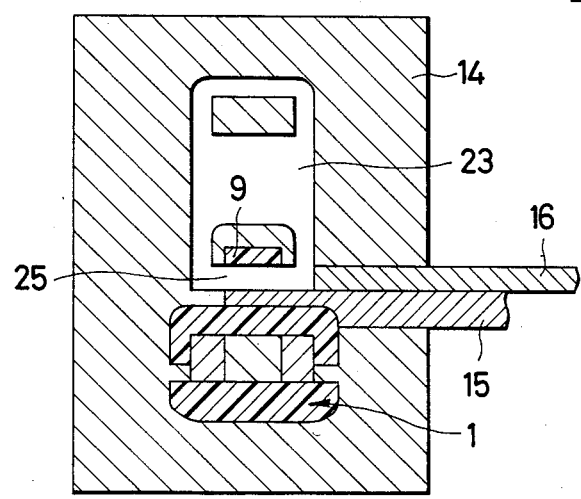
FIG. 10 is a view similar to FIG. 8, but showing the mold with parts in a position just before the second injection-molding step.

A modified mold shown in FIGS. 8–10 is similar to the mold of the foregoing embodiment but differs therefrom in that a main slide core 15 slidably supports thereon an auxiliary slide core 16 and the auxiliary slide core 16 is movable sidewise of the mold so as to project into, and contract from, the first cavity 22 in the same direction as the main slide core 15. The mold having such slide cores 15, 16 is simpler in construction and hence can be manufactured less costly than the mold of the foregoing embodiment shown in FIGS. 1–7. Since the slide cores 15, 16 are disposed on only one side of the mold cavities 22, 23, only a small space is occupied b such slide cores 15, 16 and hence the number of molded articles (i.e. sliders) per mold is increased.

Figure 11:
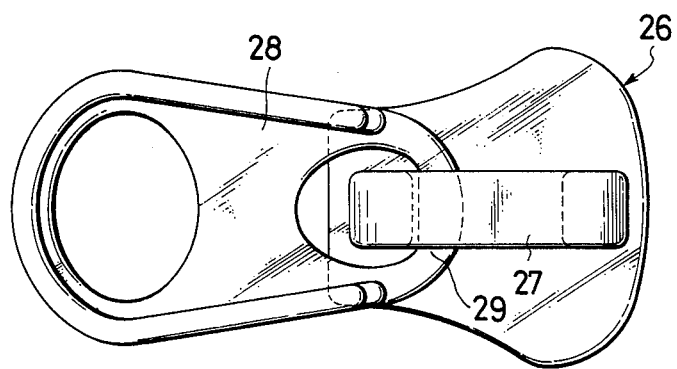
FIG. 11 is a plan view of another molded slider manufactured according to the present invention.
Figure 12:
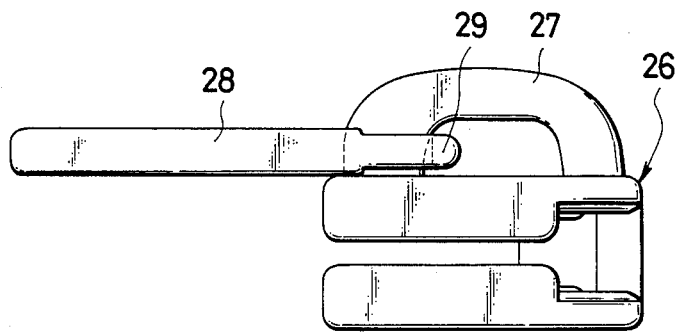
FIG. 12 is a side view of FIG. 11.
Figure 13:
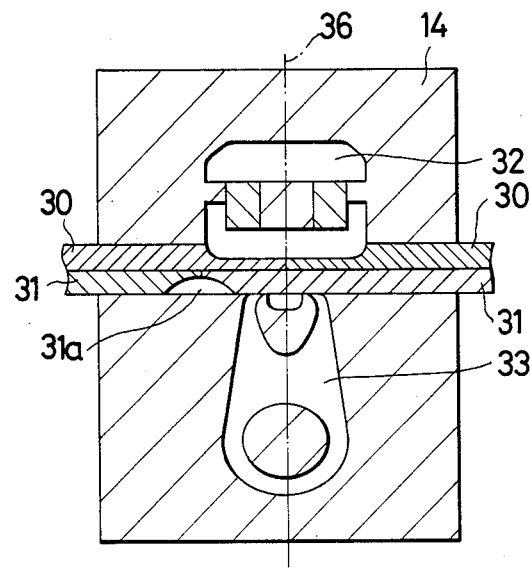
FIG. 13 is a vertical cross-sectional view of a mold used for making the slider shown in FIG. 12, the view showing the first injection-molding step.
Figure 14:
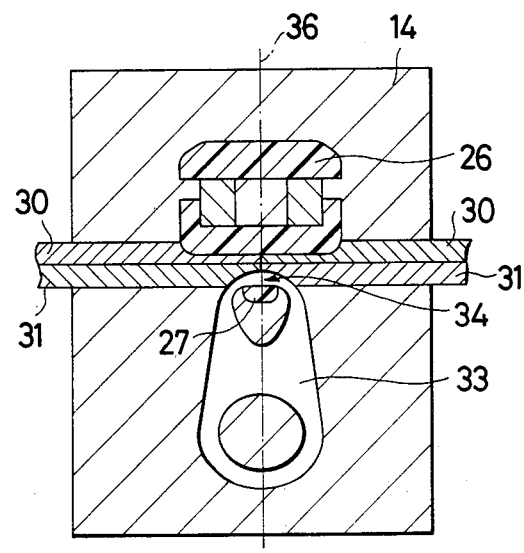
FIG. 14 is a view similar to FIG. 13, but showing the mold with parts in a position just before the second injection-molding step.

FIGS. 13 and 14 shows a modified mold used for making a slide fastener slider shown in FIGS. 11 and 12. The slider includes a slider body 26 having an arch-shaped lug 27 to which a pull tab 28 is pivotally connected. The pull tab 28 is of the so called "semi-rotary" type which is distinguished from the pull tab 2 of the foregoing embodiment by its arcuate pintle 29.

The slider is molded on the mold such that the pull tab 28 is disposed in a plane extending perpendicular to the general plane of the slider body 26. The mold of this embodiment differs from the molds of the afore-mentioned embodiments in the structure of main and auxiliary slide cores. The main slide core is composed of a pair of identical slide core members or halves 30, 30 disposed in end-to-end contact with each other. Likewise, the auxiliary slide core is composed of a pair of identical slide core members or halves 31, 31 held in abutment with each other. Each of the auxiliary slide core halves 31, 31 has a cut-out front end which defines with the cut-out front end of the opposite auxiliary slide core half 31 an arcuate recess 31a for forming the arcuate pintle 29. It is also possible to use a single auxiliary slide core in place of the two auxiliary slide cores 31 in which instance the single auxiliary slide core has an arcuate recess identical to the arcuate recess 31a.

In molding, the mold is closed while the main and auxiliary slide cores 30, 31 are held in the position shown in FIG. 13. In this position, the main slide core halves 30, 30 abut on each other in a central vertical plane 36 common to first and second mold cavities 32, 33, while the auxiliary slide core halves 31, 31 engage together at a point laterally displaced from the central vertical plane 36 and blocks fluid communication between the first and second mold cavities 32, 33. Then an amount of molten synthetic resin is injected into the closed mold to fill the first mold cavity 32. Thus, a slider body 26 having the lug 27 (shown in FIG. 11) is formed. Thereafter, while keeping the closed condition of the mold, the auxiliary slide cores 31 are laterally displaced until the arcuate recess 31a is disposed in alignment with the central vertical plane 36. Consequently, there is defined by and between the arcuate recess 31a and the underside of the already molded lug 27 a third cavity 34 which is complementary in contour to the shape of the arcuate pintle 29 of the pull tab 28 and communicates with the second cavity 33, as shown in FIG. 14. Then an amount of molten metal is injected into the closed mold to fill the second and third cavities 33, 34. After a predetermined period of time has past for solidifying the molded materials, the molded article (a prospective slider) is removed by opening the mold and retracting the main and auxiliary slide cores 30, 31. Thus, the slider body 26 and the pull tab 28 have been molded in coupled or assembled state.

Obviously, various modifications and variations of the present invention are possible in the light of the above teaching. It is therefore to be understood that within the scope of the appended claims the invention may be practiced otherwise than as specifically described.

What is claimed is:

1. A method of making an injection-molded slide fastener slider, the slider including a slider body having upper and lower wings joined at their front ends by a neck so as to define therebetween a Y-shaped guide channel, an arch-shaped support lug integral with a top surface of the upper wing and extending longitudinally of the slider body so as to define jointly with the top surface a transverse hole, and a pull tab pivotally connected with the arch-shaped support lug and having a pintle loosely received in the transverse hole, said method comprising the steps of:

(a) providing a mold including a pair of complementary mold members jointly defining therebetween a first mold cavity for forming the slider body including the support lug and a second mold cavity for forming the pull tab except the pintle, said first and second mold cavities communicating with each other, said mold further including a main slide core slidably disposed in said first cavity and having an auxiliary slide core slidably associated therewith, said main and auxiliary slide cores jointly have a shape complementary to the shape of the transverse hole, said auxiliary slide core being movable between a first position to block communication between said first and second mold cavities and a second position to allow communication between said first and second mold cavities;

(b) closing said mold while keeping said auxiliary slide core in said first position;

(c) injecting an amount of molten material into said closed mold to fill said first cavity, thereby forming the slider body and the support lug;

(d) thereafter, while keeping said mold in a closed condition, moving said auxiliary slide core from said first position to said second position to form a third cavity complementary in contour to the shape of the pintle, partly defined by an underside of the just molded support lug and communicating with said second mold cavity;

(e) then injecting an amount of molten material into said closed mold to fill said second and third mold cavities, thereby forming the pull tab with its pintle pivotally connected with the lug on the molded slider body; and (f) cooling the molded slider body and pull tab for a length of time adequate for solidifying thereof and then removing from said mold the slider body and the pull tab molded in a coupled state.

2. A method according to claim 1, wherein said first mold cavity is filled with a first molten material and said second and third mold cavities are filled with a second molten material different from said first molten material.

3. A method according to claim 1, wherein said first mold cavity is filled with a molten material having a first color and said second and third mold cavities are filled with a molten material having a second color different from said first color.

4. A method according to claim 1, wherein the injection in step (e) is effected before the molten material filled in the first cavity is fully solidified.

5. A method according to claim 1, wherein said third cavity is defined jointly by and between said main and auxiliary slide cores and the underside of the lug of the already molded slider body.

6. A method according to claim 5, wherein said auxiliary slide core has substantially the same shape as the pintle of the pull tab.

7. A method according to claim 1, wherein said third cavity is defined jointly by and between a recessed portion of the main slide core and the underside of the lug of the already molded slider body.

8. A method according to claim 1, wherein said main slide core and said auxiliary slide core are disposed in opposed relation to each other and engageable intimately with each other.

9. A method according to claim 1, wherein said main slide core and said auxiliary slide core are disposed on one side of said first cavity and are superposed one on the other.

10. A method according to claim 1, wherein said first to third mold cavities are arranged such that the pull tab molded on the mold is disposed in an upstanding position in which the pull tab extends perpendicularly to the general plane of the slider body.

* * * * *